C. Hollwede & J. Brzezinsky.
Muff.

N°61430. Patented Jan. 22. 1867.

Witnesses
Chas Morrill
Stephen Capp

Inventor
Chas. Hollwede
Julius Brzezinsky

United States Patent Office.

CHARLES HOLLWEDE, AND JULIUS BRZEZINSKY, OF NEW YORK, N. Y.

Letters Patent No. 61,430, dated January 22, 1867.

IMPROVEMENT IN MUFFS.

*The Schedule referred to in these Letters Patent and making part of the same.*

TO ALL WHOM IT MAY CONCERN:

Be it known that we, CHARLES HOLLWEDE, and JULIUS BRZEZINSKY, of the city, county, and State of New York, have invented a new and useful improved Muff; and we do hereby declare the following to be a full, clear, and exact description of the same, reference being had to the accompanying drawings, (and to the letters of reference marked thereon,) in which—

A represents the skin or body of the muff; B the lining; D the wadding; C C' the cord and tassels; F the ends of the muff composed of fur.

Figure 1:
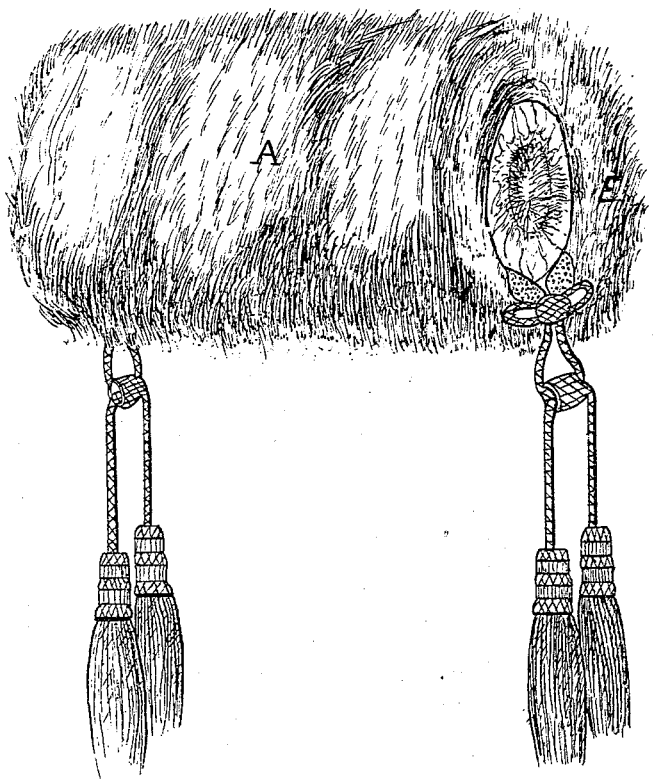
Figure 1 is a perspective view of the completed muff.
Figure 2:
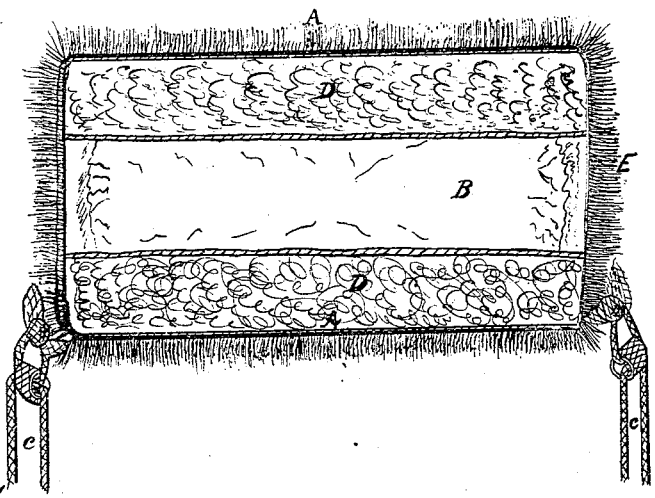
Figure 2 is a longitudinal section of the same.

The nature of our invention consists in manufacturing a muff of a skin or skins stretched and formed on a block, the edges of the skin being drawn over and formed on the ends of the block to any desired width; and in forming the fur ends of the muff partially or entirely of fur, with the tassels C C' fastened on the fur, as shown on E, in figs. 1 and 2.

To enable others skilled in the art to make and use our invention, we will proceed to describe our process of manufacture.

A block is first prepared of a shape and size corresponding to that of the muff to be manufactured. (A skin, or more than one, if the size of the muff renders more than one necessary,) is sewed together, then thoroughly wetted and stretched tightly around the block, its edges left long enough to form over the ends of the block to a sufficient length, and then being securely fastened and left to dry. When dry and removed from the block the skin will be found to have received and will retain the shape of the block, and consequently of the muff desired; and nothing remains but to fit and insert the lining.

What we claim as our invention, and desire to secure by Letters Patent, is—

A fur muff having its ends turned and set upon a former by means substantially as shown and described.

CHAS. HOLLWEDE.
JULIUS BRZEZINSKY.

Witnesses:
   WM. H. BISHOP,
   CHAS. MORRILL.